United States Patent [19]

Weinstock

[11] 3,839,321

[45] *Oct. 1, 1974

[54] 5-SULFAMOYL-N-(2-SUBSTITUTED-ETHYL) ANTHRANILIC ACIDS

[75] Inventor: Joseph Weinstock, Phoenixville, Pa.

[73] Assignee: SmithKline Corporation, Philadelphia, Pa.

[22] Filed: July 21, 1966

[21] Appl. No.: 566,759

[ * ] Notice: The portion of the term of this patent subsequent to Sept. 30, 1986, has been disclaimed.

[52] U.S. Cl............ 260/239.6, 260/397.7, 424/228, 424/229
[51] Int. Cl. ........................ A61k 27/00, C07d 7/04
[58] Field of Search...................... 260/239.6, 397.7

[56] References Cited
UNITED STATES PATENTS

| | | | |
|---|---|---|---|
| 2,910,488 | 10/1959 | Novello | 260/397.7 |
| 3,058,882 | 10/1962 | Stürm et al. | 167/51.5 |
| 3,470,155 | 9/1969 | Weinstock | 260/239.6 |
| 3,532,792 | 10/1970 | Wilson | 424/229 |
| 3,565,920 | 2/1971 | Werner | 260/347.2 |
| 3,567,714 | 3/1971 | Wilson | 260/239.6 |
| 3,577,409 | 5/1971 | Cragoe | 260/239.6 |

FOREIGN PATENTS OR APPLICATIONS 1,122,541   8/1962   Germany

OTHER PUBLICATIONS

Yale, J. Med. and Pharm. Chem., Vol. 1, No. 2, pages 121–31 (1959).
Sturm, et al. (II), Chem. Ber., 99(1), 328–44 (1–1966).

Primary Examiner—John D. Randolph
Assistant Examiner—C. M. S. Jaisle
Attorney, Agent, or Firm—Joan S. Keps; Richard D. Foggio; William H. Edgerton

[57] ABSTRACT

Anthranilic acid compounds, having diuretic and, in particular, saluretic activity and also having antihypertensive activity, are prepared by reacting a 2-halo-5-sulfamoylbenzoic acid or lower alkyl ester thereof with a 2-substituted-ethylamine.

2 Claims, No Drawings

5-SULFAMOYL-N-(2-SUBSTITUTED-ETHYL) ANTHRANILIC ACIDS

This invention relates to new 5-sulfamoyl-N-(2-substituted-ethyl)anthranilic acids having, as a distinctive structural feature, a two carbon atom chain between the nitrogen atom of an anthranilic acid and a cyclic substituent. These compounds have unexpected diuretic and, in particular, saluretic activity and also have antihypertensive activity.

Diuretic activity for the N-(2-substituted-ethyl)-anthranilic acids of this invention is surprising in view of Sturm et al., Chem. Ber. 99(1):328–344 (1966), who report that saluretic activity was found for anthranilic acid derivatives particularly where an aromatic or heteroaromatic radical is bound to the amino group via a methylene group and that after testing many anthranilic acid derivatives, furosemide, which is 4-chloro-5-sulfamoyl-N-(2-furylmethyl)-anthranilic acid, was by far the most effective saluretic agent. Unexpectedly in view of this teaching, it has now been found that 4-chloro-5-sulfamoyl-N-[2-(2-furyl)ethyl]-anthranilic acid which is the N-(2-substituted-ethyl) compound of this invention most closely related to furosemide, differing from furosemide only in having an ethyl group between the amino and the heterocyclic group rather than a methyl group, has a very high order of saluretic activity. Also, it has been found that this furylethyl compound of this invention has a more consistent dose response than furosemide.

The 5-sulfamoyl-N-(2-substituted-ethyl)anthranilic acids of this invention are represented by the following formula:

FORMULA I

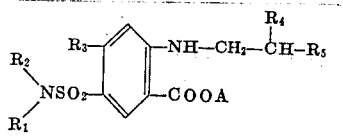

in which:

A is hydrogen, lower alkyl, phenyl or phenyl-lower alkyl;
$R_1$ and $R_2$ are hydrogen or lower alkyl;
$R_3$ is hydrogen, chloro, bromo, fluoro, trifluoromethyl, lower alkyl or lower alkoxy;
$R_4$ is hydrogen, lower alkyl or hydroxy and
$R_5$ is furyl, thienyl, cycloalkyl, cycloalkenyl, norbornenyl, 2-(3,4-dihydro-2H-pyranyl), tetrahydrofuryl, tetrahydrothienyl, tetrahydropyranyl or tetrahydrothiapyranyl.

Preferred compounds of Formula I are represented by the following formula:

FORMULA II

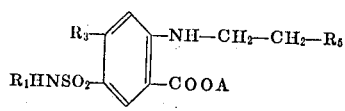

in which:

A is hydrogen or methyl;
$R_1$ is hydrogen or lower alkyl;
$R_3$ is chloro or trifluoromethyl and
$R_5$ is 2-furyl, 2-thienyl, 2-(3,4-dihydro-2H-pyranyl) or 2-tetrahydropyranyl.

The term "lower alkyl" and "lower alkoxy" where used herein denote groups having one-sixth, preferably one-fourth, carbon atoms.

Also included in this invention are pharmaceutically acceptable carboxylic acid salts of the compounds of Formula I prepared by reacting the carboxylic acid with an inorganic or organic base such as an alkali metal hydroxide, for example, sodium or potassium hydroxide, ammonia or benzylamine.

The compounds of this invention are prepared as follows:

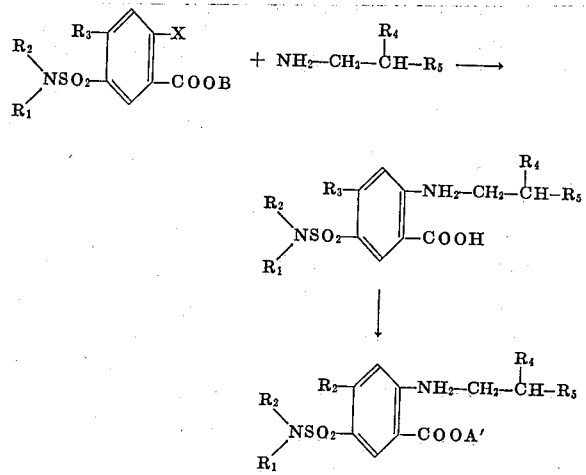

The terms $R_1$, $R_2$, $R_3$, $R_4$ and $R_5$ are as defined above; A' is lower alkyl, phenyl or phenyl-lower alkyl; B is hydrogen or lower alkyl and X is chloro, bromo or fluoro chosen so that when $R_3$ is chloro, X is chloro or fluoro; when $R_3$ is bromo, X is chloro, bromo or fluoro and when $R_3$ is fluoro, X is fluoro.

According to the above procedure a 2-halo-4-$R_3$-5-sulfamoylbenzoic acid or a lower alkyl ester thereof is reacted with a 2-substituted -ethylamine. The reaction is carried out at elevated temperature in a suitable solvent such as methoxyethanol, the dimethyl ether of diethylene glycol or dimethyl sulfoxide. Preferably, the benzoic acid is reacted with an excess of the amine. When a lower alkyl ester of the benzoic acid is employed, about an equimolar amount of the amine is used and a suitable less reactive organic base such as triethylamine may be used in the reaction as an acid acceptor.

The esters of the anthranilic acids of Formula I are prepared by reacting the acid with thionyl chloride in chloroform and reacting the resulting acid chloride with A'OH.

The 2-halo-4-$R_3$-5-sulfamoylbenzoic acid and lower alkyl ester starting materials are either known to the art or are prepared by procedures I or II as follows:

I.

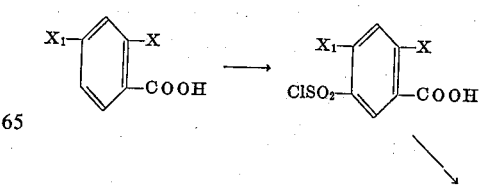

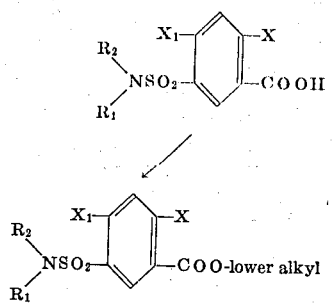

The terms $R_1$ and $R_2$ are as defined above; $X_1$ is hydrogen, chloro, bromo, fluoro, lower alkyl, lower alkoxy or nitro and X is chloro, bromo or fluoro chosen so that when $X_1$ is chloro, X is chloro or fluoro; when $X_1$ is bromo, X is chloro, bromo or fluoro and when $X_1$ is fluoro, X is fluoro.

II.

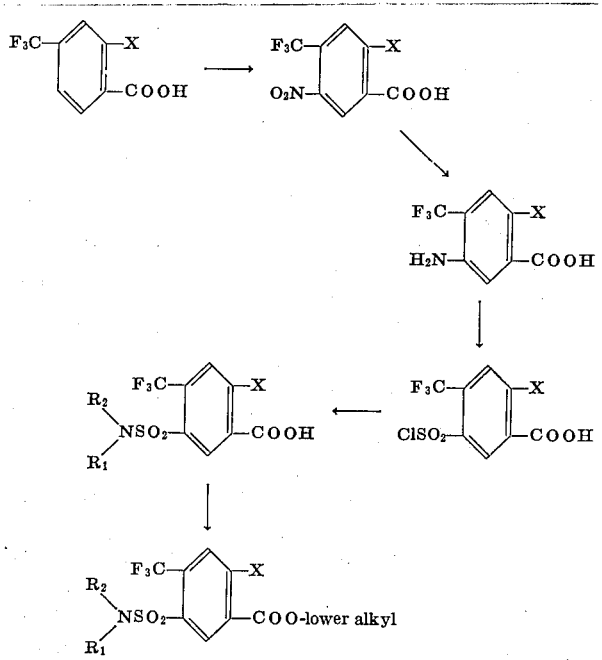

The terms $R_1$ and $R_2$ are as defined above and X is chloro, bromo or fluoro.

According to procedure I, a 2-halobenzoic acid is heated with an excess of chlorosulfonic acid and the resulting 5-chlorosulfonyl compound is treated with ammonium hydroxide or with a mono- or di-lower alkylamine to give a 2-halo-5-sulfamoylbenzoic acid. The lower alkyl esters are prepared by heating the benzoic acid with an excess of a lower alkanol in the presence of a mineral acid such as sulfuric acid.

According to procedure II, a 2-halo-4-trifluoromethylbenzoic acid is treated with fuming sulfuric acid and fuming nitric acid to give a 2-halo-5-nitro-4-trifluoromethylbenzoic acid. The nitro group is reduced by treating with a chemical reducing agent such as iron powder in aqueous ammonium chloride solution to give a 5-amino-2-halo-4-trifluoromethylbenzoic acid. Treating this amino compound with concentrated hydrochloric acid and sodium nitrite followed by a solution of sulfur dioxide in acetic acid containing cuprous or cupric chloride and treating the resulting 5-chlorosulfonyl compound with ammonium hydroxide or with a mono- or di-lower alkylamine gives a 2-halo-5-sulfamoyl-4-trifluoromethylbenzoic acid. Esterifying the benzoic acid by heating with an excess of a lower alkanol in the presence of a mineral acid such as sulfuric acid gives the lower alkyl ester.

The 5-sulfamoyl-N-(2-substituted-ethyl)anthranilic acids of Formula I or pharmaceutically acceptable salts thereof will be, preferably, combined with pharmaceutical carriers to form pharmaceutical compositions. The pharmaceutical compositions, in dosage unit form, will contain an anthranilic acid derivative of Formula I in an effective, nontoxic amount.

The pharmaceutical carriers may be either solids or liquids. Exemplary of solid carriers are lactose, magnesium stearate, terra alba, sucrose, talc, stearic acid, gelatin, agar, pectin and acacia. Exemplary of liquid carriers are peanut oil, olive oil, sesame oil and water. The carrier or diluent may include a time delay material such as glyceryl monostearate or gylceryl distearate alone or with a wax.

A wide variety of pharmaceutical forms can be employed. Thus, if a solid carrier is used, the preparation can be tableted, placed in a hard gelatin capsule or in the form of a troche or lozenge. The amount of solid carrier may vary widely but preferably will be from about 25 mg. to about 1 g. If a liquid carrier is used, the preparation may be in the form of a soft gelatin capsule, placed in an ampule or in a liquid suspension.

A 5-sulfamoyl-N-(2-substituted-ethyl)anthranilic acid of Formula I or a pharmaceutically acceptable salt thereof, preferably in a pharmaceutical composition, will be administered to animals internally, preferably orally, in an amount which is sufficient to produce diuresis and is nontoxic. Advantageously, a dose will be administered from one to four times daily.

The following examples are not limiting but are illustrative of the compounds of this invention.

EXAMPLE I

To 18 g. of 2,4-dichloro-5-sulfamoylbenzoic acid in 50 ml. of 2-methoxyethanol is added 33.1 g. of 2-(2-furyl)-ethylamine and 30 ml. of 2-methoxyethanol. The resulting solution is stirred and refluxed under nitrogen for five hours.

The reaction mixture is then poured into 500 ml. of ice water and the resulting mixture is acidified to pH 1 with hydrochloric acid, then chilled and stirred. The precipitate is filtered off, washed with ice water and dissolved in ethanol-water. The solution is treated with charcoal, filtered, then cooled and filtered to give 4-chloro-5-sulfamoyl-N-[2-(2-furyl)ethyl]anthranilic acid.

EXAMPLE 2

A mixture of 19 g. of 2,4-dichlorobenzoic acid and 58 g. of chlorosulfonic acid is heated to 160°C., then cooled and poured into ice water. Filtering gives 2,4-dichloro-5-chlorosulfonylbenzoic acid. Treating this 5-chlorosulfonyl compound with a cold aqueous methanol solution containing 12.4 g. of methylamine, then concentrating the mixture in vacuo, acidifying with hydrochloric acid and filtering gives 5-methyl-sulfamoyl-2,4-dichlorobenzoic acid.

2-(2-Furyl)ethylamine (28 g.) and 25 ml. of 2-methoxyethanol are added to 14.2 g. of 5- methylsulfamoyl-2,4-dichlorobenzoic acid in 50 ml. of 2-methoxyethanol. The mixture is heated, with stirring, at reflux under nitrogen for 5 hours. Working up as in Example 1 gives 4-chloro-5-methylsulfamoyl-N-[2-(2-furyl)ethyl]anthranilic acid.

By the same procedure using, in place of methylamine in aqueous methanol, the following amines in ethanol:
  18 g. of ethylamine
  29.2 g. of n-butylamine
  40.4 g. of n-hexylamine
the products are, respectively:
  4-chloro-5-ethylsulfamoyl-N-[2-(2-furyl)ethyl]-anthranilic acid
  5-n-butylsulfamoyl-4-chloro-N-[2-(2-furyl)ethyl]-anthranilic acid
  4-chloro-5-n-hexylsulfamoyl-N-[2-(2-furyl)ethyl]-anthranilic acid.

EXAMPLE 3

To 28.4 g. of methyl 2,4-dichloro-5-sulfamoylbenzoate in 84 ml. of the dimethyl ether of diethylene glycol is added 84 ml. of triethylamine and 14.2 g. of 2-(2-tetrahydropyranyl)-ethylamine. The mixture is heated at reflux with stirring for 3 hours, then 450 ml. of water and 450 ml. of ether are added slowly and the resulting mixture is acidified with hydrochloric acid. The ether layer is washed with hydrochloric acid and water and extracted with 0.5 N potassium hydroxide solution. Ethyl acetate is added to the extract and the mixture is slowly acidified to pH 3.5 with acetic acid. The mixture is shaken and the ethyl acetate layer is extracted with saturated sodium bicarbonate solution. The extract is acidified to pH 5.5 with hydrochloric acid. Filtering, dissolving the solid material in aqueous sodium bicarbonate solution, reprecipitating with hydrochloric acid, filtering and recrystallizing from ethyl acetate gives 4-chloro-5-sulfamoyl-N-[2-(2-tetrahydropyranyl)ethyl]anthranilic acid.

EXAMPLE 4

By the procedure of Example 1 using, in place of 2-(2-furyl)ethylamine, the following:
  2-(2-tetrahydrofuryl)ethylamine
  2-cyclohexylethylamine
  2-cyclopentylethylamine
  2-[2-(5-norbornenyl)]ethylamine
  2-(3-tetrahydropyranyl)ethylamine
  2-(2-thienyl)ethylamine
  2-(3-thienyl)ethylamine
  2-(2-cyclopentenyl)ethylamine
the products are, respectively:
  4-chloro-5-sulfamoyl-N-[2-(2-tetrahydrofuryl)ethyl]-anthranilic acid
  4-chloro-5-sulfamoyl-N-[2-(2-cyclohexyl)ethyl]-anthranilic acid
  4-chloro-5-sulfamoyl-N-[2-(2-cyclopentyl)ethyl]-anthranilic acid
  4-chloro-5-sulfamoyl-N-{2-[2-(5-norbornenyl)]ethyl}-anthranilic acid
  4-chloro-5-sulfamoyl-N-[2-(3-tetrahydropyranyl)ethyl]anthranilic acid
  4-chloro-5-sulfamoyl-N-[2-(2-thienyl)ethyl]-anthranilic acid
  4-chloro-5-sulfamoyl-N-[2-(3-thienyl)ethyl]-anthranilic acid
  4-chloro-5-sulfamoyl-N-[2-(2-cyclopentenyl)ethyl]-anthranilic acid.

EXAMPLE 5

A mixture of 112 g. of 2-(3,4-dihydro-2H-pyran)-carboxaldehyde, 61 g. of nitromethane and 50 ml. of ethanol is treated carefully at 30°–35°C. with 8 ml. of 10N sodium hydroxide. The reaction mixture is allowed to stand at 35°C. for 4 days and is then neutralized with hydrochloric acid. Distillation at 1 mm. gives 1-[2-(3,4-dihydro-2H-pyranyl)]-2-nitroethanol. This compound (100 g.) is refluxed with 100 g. of acetic anhydride for 3 hours and then washed with water. The crude acetate is stirred for 2 hours with a suspension of 75 g. of potassium bicarbonate in 300 ml. of water at 50°C. Extraction and distillation gives 2-(2-nitro)ethyl-3,4-dihyrdo-2H-pyran. Refluxing 55 g. of this compound with 50 g. of lithium aluminum hydride in ether for 3 hours with stirring, then with continued stirring adding water, then aqueous sodium hydroxide, filtering and then concentrating and distilling the ether layer gives 2-(3,4-dihydro-2H-pyranyl)ethylamine.

By the procedure of Example 1 using 38.1 g. of 2-(3,4-dihydro-2H-pyranyl)ethylamine in place of 2-(2-furyl)-ethylamine, the product is 4-chloro-5-sulfamoyl-N-{2-[2-(3,4-dihydro-2H-pyranyl)]ethyl}anthranilic acid.

EXAMPLE 6

Thionyl chloride (5.9 g.) is added to a stirred refluxing mixture of 3.4 g. of 4-chloro-5-sulfamoyl-N-[2-(2-furyl)ethyl]anthranilic acid, 25 ml. of dry benzene and two drops of pyridine under nitrogen. The resulting mixture is refluxed for 30 minutes and filtered hot. Hexane is added and the mixture is chilled and filtered to give the anthranilic acid chloride. Adding the acid chloride to 100 ml. of absolute methanol, heating the mixture on a steam bath for 30 minutes, then cooling and filtering gives methyl 4-chloro-5-sulfamoyl-N-[2-(2-furyl)ethyl]anthranilate.

By the same procedure using ethanol, n-butanol and n-hexanol in place of methanol the corresponding ethyl, n-butyl and n-hexyl esters are obtained.

EXAMPLE 7

Five grams of 2-bromo-4-trifluoromethylbenzoic acid is added with stirring to 31 g. of fuming 30 percent sulfuric acid. To this mixture is added dropwise 7.7 g. of fuming nitric acid keeping the temperature below 70°C. The mixture is heated with stirring on a steam bath for 2 hours, then treated with a large excess of ice water and filtered to give 2-bromo-5-nitro-4-trifluoromethylbenzoic acid.

To a mixture of 4.8 g. of iron powder and a solution of 2.5 g. of ammonium chloride in 40 ml. of water at 50°C. is added 4.5 g. of 2-bromo-5-nitro-4-trifluoromethylbenzoic acid. The resulting mixture is heated on a steam bath with stirring for 3 hours, then treated with 10 percent sodium carbonate, filtered, neutralized with concentrated hydrochloric acid, allowed to stand, cooled and filtered to give 5-amino-2-bromo-4-trifluoromethylbenzoic acid.

To a suspension of 4.3 g. of 5-amino-2-bromo-4-trifluoromethylbenzoic acid in 10 ml. of concentrated hydrochloric acid at 6°C. is added slowly with stirring a solution of 1.14 g. of sodium nitrite in 60 ml. of water. The resulting cold mixture is poured with stirring into 15 ml. of acetic acid containing 0.2 g. of cuprous chloride. The solid material is filtered off, washed with water and then added with stirring to an excess of ammonium hydroxide. After stirring at room temperature for 2 hours, the solution is made acid with concentrated hydrochloric acid and the 2-bromo-5-sulfamoyl-4-trifluoromethylbenzoic acid is filtered off, washed with water and dried.

A mixture of 17.4 g. of 2-bromo-5-sulfamoyl-4-trifluoromethylbenzoic acid and 16.7 g. of 2-(2-furyl)ethyl-amine in 100 ml. of the dimethyl ether of diethylene glycol is heated at reflux with stirring under nitrogen for 5 hours. Pouring the reaction mixture into ice water, acidifying the resulting mixture to pH 1 with hydrochloric acid and working up as in Example 1 gives 5-sulfamoyl-4-trifluoromethyl-N-[2-(2-furyl)ethyl]anthranilic acid.

Using 18.8 g. of 2-(2-cyclohexenyl)ethylamine in place of 2-(2-furyl)ethylamine in the above procedure, the product is 5-sulfamoyl-4-trifluoromethyl-N-[2-(2-cyclohexenyl)-ethyl]anthranilic acid.

EXAMPLE 8

A mixtue of 16.2 g. of 2,4-difluorobenzoic acid and 58 g. of chlorosulfonic acid is heated to 160°C., then cooled and poured into ice water. Filtering gives 2,4-difluoro-5-chlorosulfonylbenzoic acid. Treating this 5-chlorosulfonyl compound with a cold aqueous methanol solution of dimethylamine, then concentrating the mixture in vacuo, acidifying with hydrochloric acid and filtering gives 2,4-difluoro-5-dimethylsulfamoylbenzoic acid.

To 2.7 g. of 2,4-difluoro-5-dimethylsulfamoylbenzoic acid in 25 ml. of 2-methoxyethanol is added 3.3 g. of 2-(2-furyl)ethylamine. The mixture is stirred and heated at reflux under nitrogen for five hours, then poured into ice water. The resulting mixture is acidified with hydrochloric acid to pH 1 and worked up as in Example 1 to give 4-fluoro-5-dimethyl-sulfamoyl-N-[2-(2-furyl)ethyl]anthranilic acid.

EXAMPLE 9

Using 18 g. of 2,4-dibromo-5-sulfamoylbenzoic acid and 27.5 g. of 2-(2-furyl)ethylamine in the procedure of Example 1, the product is 4-bromo-5-sulfamoyl-N-[2-(2-furyl)-ethyl]anthranilic acid.

Treating the above prepared anthranilic acid with an equimolar amount of benzylamine in methanol at room temperature, then evaporating the methanol in vacuo gives the benzylamine salt of 4-bromo-5-sulfamoyl-N-{2-(2-furyl)ethyl}anthranilic acid.

EXAMPLE 10

To a solution of 160 g. of sodium hydroxide in 800 ml. of water and 200 ml. of methanol at −10°C. is added 140 g. of nitromethane over a 30 minute period. Then 1 l. of ice water is added. 3-Furaldehyde (200 g.) is then added over a 20 minute period keeping the temperature below −5°C. Ice water (1 l.) is added and the mixture is stirred for 10 minutes. The mixture is then poured into a solution of 250 ml. of concentrated sulfuric acid in 2 l. of water. Filtration gives 3-(2-nitrovinyl)furan which is recrystallized from carbon tetrachloride.

Reduction of 46 g. of 3-(2-nitrovinyl)furan using 45 g. of lithium aluminum hydride in 1.2 l. of ether by the procedure of Example 5 with distillation at atmospheric pressure gives 2-(3-furyl)ethylamine.

By the procedure of Example 1, the above prepared 2-(3-furyl)ethylamine is reacted with 2,4-dichloro-5-sulfamoylbenzoic acid to give 4-chloro-5-sulfamoyl-N-[2-(3-furyl)ethyl]-anthranilic acid.

A sample of the above prepared anthranilic acid is treated with an equimolar amount of potassium hydroxide in water to give, after removing the water in vacuo, the potassium salt of 4-chloro-5-sulfamoyl-N-[2-(3-furyl)ethyl]anthranilic acid.

EXAMPLE 11

A mixture of 156 g. of 2-tetrahydrothiapyrancarboxylic acid and 72 g. of sodium borohydride in 1 l. of tetrahydrofuran is treated with a solution of 284 g. of boron trifluoride etherate in 900 ml. of tetrahydrofuran keeping the temperature below 25°C. After stirring for 2 hours at 25°C., 100 ml. of ethanol is added slowly, followed by 300 ml. of concentrated hydrochloric acid dissolved in 3 l. of water. Extraction of this reaction mixture with ether followed by distillation gives 2-tetrahydrothiapyranylmethanol.

A solution of 94 g. of the above prepared compound in 2 l. of dimethylsulfoxide and 1400 ml. of acetic anhydride is allowed to stand at room temperature for 18 hours. Dilution with 2 l. of water followed by extraction with ether and distillation gives 2-tetrahydrothiapyrancarboxaldehyde. By the procedure of Example 10, 2-tetrahydrothiapyrancarboxaldehyde is converted to 2-(2-tetrahydrothiapyranyl)ethylamine.

By the procedure of Example 3, using 16 g. of 2-(2-tetrahydrothiapyranyl)ethylamine in place of 2-(2-tetrahydropyranyl)ethylamine, the product is 4-chloro-5-sulfamoyl-N-[2-(2-tetrahydrothiapyranyl)ethyl]anthranilic acid.

By the procedure described above, using 3-tetrahydrothiapyrancarboxylic acid, the product is 4-chloro-5-sulfamoyl-N-[2-(3-tetrahydrothiapyranyl)ethyl]anthranilic acid.

EXAMPLE 12

By the procedure of Example 11, 2-tetrahydrothiophenecarboxylic acid is converted to 2-(2-tetrahydrothienyl)-ethylamine.

Using 39.3 g. of 2-(2-tetrahydrothienyl)ethylamine in place of 2-(2-furyl)ethylamine in the procedure of Example 1, the product is 4-chloro-5-sulfamoyl-N-[2-(2-tetrahydrothienyl)ethyl]anthranilic acid.

By the above described procedure using 3-tetrahydrothiophenecarboxylic acid, the product is 4-chloro-5-sulfamoyl-N-[2-(3-tetrahydrothienyl)ethyl]anthranilic acid.

EXAMPLE 13

Using 38.1 g. of 2-amino-1-(2-furyl)ethanol in place of 2-(2-furyl)ethylamine in the procedure of Example 1, the product is 4-chloro-5-sulfamoyl-N-[2-(2-furyl)-2-hydroxyethyl]-anthranilic acid.

EXAMPLE 14

A mixture of 17.0 g. of 2-chloro-p-toluic acid and 58 g. of chlorosulfonic acid is heated to 160°C., then cooled and poured into ice water. Filtering gives 2-chloro-5-chlorosulfonyl-p-toluic acid. Treating this 5-chlorosulfonyl compound with ammonium hydroxide, stirring the mixture, then acidifying with concentrated hydrochloric acid and filtering gives 2-chloro-5-sulfamoyl-p-toluic acid.

A mixture of 12.5 g. of 2-chloro-5-sulfamoyl-p-toluic acid, 32.3 g. of 2-(2-tetrahydropyranyl)ethylamine and 75 ml. of the dimethyl ether of diethylene glycol is heated at reflux for 4 hours, then poured into ice water. Acidifying the mixture with hydrochloric acid and working up as in Example 1 gives 4-methyl-5-sulfamoyl-N-[2-(2-tetrahydropyranyl)ethyl]anthranilic acid.

Using 27.8 g. of 2-(2-furyl)ethylamine in the above procedure, the product is 4-methyl-5-sulfamoyl-N-[2-(2-furyl)-ethyl]anthranilic acid.

EXAMPLE 15

By the procedure of Example 14 the following benzoic acid derivatives are converted to the corresponding 5-sulfamoylbenzoic acids:
2-fluorobenzoic acid
2-chloro-p-anisic acid
2-chloro-4-ethylbenzoic acid.

Reacting each of the above 5-sulfamoylbenzoic acids with 2-(2-furyl)ethylamine by the procedure of Example 1 gives the following products, respectively:
5-sulfamoyl-N-[2-(2-furyl)ethyl]anthranilic acid
4-methoxy-5-sulfamoyl-N-[2-(2-furyl)ethyl]-anthranilic acid
4-ethyl-5-sulfamoyl-N-[2-(2-furyl)ethyl]-anthranilic acid.

EXAMPLE 16

Three grams of 4-chloro-5-sulfamoyl-N-[2-(2-furyl)-ethyl]anthranilic acid chloride, prepared from 4-chloro-5-sulfamoyl-N-[2-(2-furyl)ethyl]anthranilic acid by the procedure of Example 6, is heated on a steam bath with 20 g. of benzyl alcohol to give, after cooling and filtering, benzyl 4-chloro-5-sulfamoyl-N-[2-(2-furyl)ethyl]anthranilate.

Using 2-phenylethanol in the above reaction the product is phenethyl 4-chloro-5-sulfamoyl-N-[2-(2-furyl)-ethyl]anthranilate.

A mixture of 4.8 g. of 4-chloro-5-sulfamoyl-N-[2-(2-furyl)ethyl]anthranilic acid chloride in 25 ml. of benzene is heated with 1.6 g. of pyridine and 1.8 g. of phenol on a steam bath for 15 minutes. The solution is cooled, washed with water and dried over sodium sulfate. Concentrating, then adding hexane and filtering gives phenyl 4-chloro-5-sulfamoyl-N-[2-(2-furyl)ethyl]anthranilate.

EXAMPLE 17

A mixture of 114 g. of 2-tetrahydropyrancarboxaldehye, 50 ml. of ethanol and 61 g. of nitromethane is treated slowly at 30°–35°C. with 8 ml. of 10N sodium hydroxide. The reaction mixture is allowed to stand at 35°C. for four days and is then neutralized with hydrochloric acid. Distillation at 5 mm. gives 1-(2-tetrahydropyranyl)-2-nitroethanol. This compound is dissolved in methanol. The methanol solution is treated with 2 g. of platinum oxide, then is saturated with ammonia and hydrogenated. Filtering, concentrating and distilling gives 2-amino-1-(2-tetrahydropyranyl)ethanol.

Reacting the above prepared 2-amino-1-(2-tetrahydropyranyl)ethanol with 2,4-dichloro-5-sulfamoylbenzoic acid by the procedure of Example 1 gives 4-chloro-5-sulfamoyl-N-[2-hydroxy-2-(2-tetrahydropyranyl)ethyl]anthranilic acid.

By the same procedure using 3-tetrahydrofuraldehyde, the product is 4-chloro-5-sulfamoyl-N-[2-hydroxy-2-(3-tetra-hydrofuryl)ethyl-]anthranilic acid.

EXAMPLE 18

A solution of 7.8 g. of sodium borohydride and 50 g. of 2-isopropenylfuran in 250 ml. of the dimethyl ether of diethylene glycol is treated at 0°–5°C. under nitrogen with 39 g. of boron trifluoride etherate. The solution is then stirred at room temperature for 3 hours. A solution of 62.2 g. of hydroxylamine-o-sulfuric acid in 250 ml. of the dimethyl ether of diethylene glycol is added and the mixture is heated at 100°C. for 3 hours. The cooled solution is treated with 200 ml. of concentrated hydrochloric acid and 2 l. of water. The solution is extracted with ether and then made strongly alkaline with sodium hydroxide. Extraction with ether and distillation gives 2-(2-furyl)propylamine.

Reacting the above prepared amine with 2,4-dichloro-5-sulfamoylbenzoic acid by the procedure of Example 1 gives 4-chloro-5-sulfamoyl-N-[2-(2-furyl)-propyl]anthranilic acid.

EXAMPLE 19

A suspension of 24 g. of sodium hydride in 500 ml. of dimethylsulfoxide is heated at 80°C. for one hour and then cooled to 5°C. A solution of 357 g. of methyltriphenyl-phosphonium bromide in 1 l. of warm dimethylsulfoxide is added and the solution stirred at room temperature for 15 minutes. Methyl 2-tetrahydrofuryl ketone (114 g.) is added and the solution is stirred overnight at room temperature. The reaction mixture is diluted with 2 l. of water and extracted with hexane. The hexane extract is dried and distilled to give 2-isopropenyl-tetrahydrofuran.

By the procedure of Example 18, using 2-isopropenyl-tetrahydrofuran in the place of 2-isopropenylfuran, the product is 4-chloro-5-sulfamoyl-N-[2-(2-tetrahydrofuryl)propyl]-anthranilic acid.

EXAMPLE 20

By the procedure of Example 19, using, in place of methyl 2-tetrahydrofuryl ketone, the following:
methyl 2-thienyl ketone
3-furyl methyl ketone
methyl 2-tetrahydropyranyl ketone
1-(2-furyl)-1-pentanone
1-(2-thienyl)-1-pentanone
the products are, respectively:
4-chloro-5-sulfamoyl-N-[2-(2-thienyl)propyl]-anthranilic acid
4-chloro-5-sulfamoyl-N-[2-(3-furyl)propyl]-anthranilic acid
4-chloro-5-sulfamoyl-N-[2-(2-tetrahydropyranyl)-propyl]anthranilic acid
4-chloro-5-sulfamoyl-N-[2-(2-furyl)hexyl]-anthranilic acid
4-chloro-5-sulfamoyl-N-[2-(2-thienyl)hexyl]-anthranilic acid.

What is claimed is:
1. 4-Chloro-5-sulfamoyl-N-{2-[2-(3,4-dihydro-2H-pyranyl)]ethyl}anthranilic acid.
2. 4-Chloro-5-sulfamoyl-N-[2-hydroxy-2-(2-tetrahydropyranyl)ethyl]anthranilic acid.

* * * * *

PO-1050
(5/69)

UNITED STATES PATENT OFFICE
CERTIFICATE OF CORRECTION

Patent No. 3,839,321  Dated October 1, 1974

Inventor(s) Joseph Weinstock

It is certified that error appears in the above-identified patent and that said Letters Patent are hereby corrected as shown below:

Column 2, lines 4-5, "one-sixth, preferably one-fourth," should read -- 1-6, preferably 1-4, -- .

Signed and Sealed this seventeenth Day of February 1976

[SEAL]

Attest:

RUTH C. MASON
*Attesting Officer*

C. MARSHALL DANN
*Commissioner of Patents and Trademarks*